United States Patent Office 3,489,813
Patented Jan. 13, 1970

3,489,813
α,α-BIS(TRIFLUOROMETHYL)BENZYL
ALKAPOLYENYL ETHERS
Kenneth C. Dewhirst, New Rochelle, N.Y., assignor to
Shell Oil Company, New York, N.Y., a corporation of
Delaware
No Drawing. Filed Aug. 21, 1967, Ser. No. 661,773
Int. Cl. C07c 41/10, 41/06, 43/14
U.S. Cl. 260—611                            10 Claims

ABSTRACT OF THE DISCLOSURE

α,α-bis(trifluoromethyl)benzyl 2,7(11)-alkapolyenyl ethers are produced by a dimerization-addition reaction of a tertiary alcohol, α,α-bis(trifluoromethyl)benzyl alcohol, with conjugated polyene, e.g., butadiene or a mixture of butadiene and 1,3,7-octatriene, in the presence of palladium or platinum complexed with tertiary phosphine ligands or nickel complexed with phosphite ligands. In a subsequent decomposition process the unsaturated ethers are converted to the original alcohol and the corresponding 1,3,7(11)-alkapolyene hydrocarbons, i.e., 1,3,7,11-dodecatetraene and/or 1,3,7-octatriene. The unsaturated ethers are also useful for conversion to epoxides.

BACKGROUND OF THE INVENTION

In copending application of E. J. Smutny, U.S. Ser. No. 456,000, filed May 14, 1965, and now abandoned, diene dimer derivatives wherein conjugated diene moieties have dimerized in a linear manner concomitant with addition of primary or secondary aliphatic alcohol reagents, such as methanol, ethylene glycol, benzyl alcohol and the like, to produce aliphatic alkadienyl ethers have been obtained utilizing palladium-, platinum- or ruthenium-containing catalyst. Tertiary aliphatic alcohols have not been effective in this process for the production of unsaturated ethers.

SUMMARY OF THE INVENTION

It has now been found that a certain tertiary aliphatic alcohol can be reacted with conjugated polyene in the presence of certain metal-containing complexes as catalyst to produce corresponding aliphatic alkapolyenyl ethers. It is surprising that the particular tertiary alcohol, α,α-bis(trifluoromethyl)benzyl alcohol [C₆H₅C(CF₃)₂OH] or named alternatively hexafluoro-2-phenyl-propan-2-ol, reacts with conjugated polyene such as butadiene or a mixture of butadiene and 1,3,7-octatriene in the presence of palladium-, platinum- or nickel-containing complexes as catalyst to produce novel α,α-bis(trifluoromethyl)benzyl 2,7(11)-alkapolyenyl ether. Furthermore, it has been found that α,α-bis(trifluoromethyl)benzyl 2,7(11)-alkapolyenyl ether can be converted facilely to 1,3,7(11)-alkapolyene and α,α-bis(trifluoromethyl)benzyl alcohol by continued heating of, e.g., by distillation of, the ether in the presence of the catalyst. The tertiary alcohol can be recycled for reaction again with conjugated polyene reactant to produce again the desired ether and 1,3,7(11)-alkapolyene. Hence, the process of the invention yields not only efficient production of α,α-bis(trifluoromethyl)benzyl 2,7(11)-alkapolyenyl ether but also a continuous process for producing 1,3,7(11)-alkapolyene.

DESCRIPTION OF PREFERRED EMBODIMENTS

The tertiary aliphatic alcohol employed as the reactant in the process of the invention is α,α-bis(trifluoromethyl)benzyl alcohol. This alcohol is conveniently prepared from the reaction of benzene and hexafluoroacetone in the presence of aluminum chloride; see, for example, B. S. Farah, E. E. Gilbert and J. P. Sibilia, J. Org. Chem., 30, 998 (1965).

The conjugated polyene employed as the other reactant in the process of the invention is 1,3-butadiene or a mixture of butadiene and 1,3,7-octatriene. In the mixture of butadiene and 1,3,7-octatriene, the molar ratio of one to the other is not critical, but in order to obtain optimum yields of product incorporating both it is preferred that a molar amount of 1,3,7-octatriene reactant equal to or in excess over the molar amount of butadiene reactant is employed. Molar ratios of 1,3,7,-octatriene reactant to butadiene reactant of from about 1:2 to about 10:1 are satisfactory, with ratios of from about 1:1 to about 5:1 being preferred.

The optimum ratio of tertiary alcohol reactant to conjugated polyene reactant will depend upon the extent of reactant conversion that is desired. Ratios of moles of polyene to moles of tertiary alcohol, i.e., hydroxyl group, as low as about 1:4 are suitable. However, to obtain higher conversions, an excess of polyene reactant is preferred and ratios of moles of polyene to moles of tertiary alcoholic hydroxyl group from about 1.5:1 to about 10:1 are more satisfactory, with best results being obtained when ratios of moles of polyene to moles of hydroxyl group from about 2:1 to about 6.5:1 are utilized.

The catalyst composition employed in the process of the invention is a metal complexed with certain phosphorus-containing ligands. The metal is a Group VIII—C metal of atomic number from 28 to 78 inclusive, i.e., the metal is nickel, palladium or platinum. Most preferred is a complex of palladium. The metals are complexed with ligands of the formula $$[R(O)_n]_3P$$

wherein $n$ is zero when the metal is palladium or platinum, $n$ is one when the metal is nickel and R independently is an organo group having from 1 to 20 carbon atoms, preferably 1 to 10, and having only aromatic unsaturation. R is therefore saturated aliphatic, including cycloaliphatic, or is aromatic in character, preferably mononuclear aromatic, and is hydrocarbyl, that is, contains only atoms of carbon and hydrogen, or is substituted hydrocarbyl containing, besides atoms of carbon and hydrogen, other atoms such as oxygen, sulfur, nitrogen and halogen, particularly halogen of atomic number from 9 to 35, which atoms are present in functional groups such as alkoxy, carboalkoxy, acyl, trihalomethyl, halo, cyano, dialkylamino, sulfonylalkyl, alkanoyloxy and like groups having no active hydrogen atoms. A preferred class of nonhydrocarbyl substituents comprises an atom having an atomic number from 7 to 8, i.e., nitrogen or oxygen, one valence of which is satisfied by bonding to an otherwise hydrocarbyl R substituent, and the remaining valence(s) are satisfied by bonding to lower alkyl radicals which are alkyl of from 1 to 4 carbon atoms. Such preferred nonhydrocarbyl substituents are alkoxy wherein the alkyl moiety is alkyl of from 1 to 4 carbon atoms and N,N-dialkylamino wherein each alkyl independently is alkyl of from 1 to 4 carbon atoms.

Illustrative of suitable saturated aliphatic R groups are hydrocarbyl R groups such as methyl, ethyl, propyl, isopropyl, butyl, isooctyl, decyl, lauryl, stearyl, cyclohexyl, cyclopentyl, 3,4-dimethylcyclopentyl, cyclooctyl, benzyl and β-phenylethyl; as well as substituted groups such as 4-bromohexyl, methoxymethyl, 3-(diethylamino)propyl, 4-carbethoxybutyl and 2-acetoxyethyl. Aromatic R groups include hydrocarbyl aromatic groups such as phenyl, tolyl, xylyl, p-ethylphenyl, p-tert-butylphenyl, m-octylphenyl, 2,4 - diethylphenyl, o-phenylphenyl, m-benzylphenyl and 2,4,6-trimethylphenyl; and substituted hydrocarbyl aromatic R groups including p-methoxyphenyl, m - chlorophenyl, m - trifluoromethylphenyl, p-propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5 - bis(trichloromethyl)phenyl and 3-dibutylaminophenyl. Largely because of economic reasons phenyl or butyl is preferred.

Without wishing to be bound by any particular theory, it appears that the chemical transformations during the course of the reaction which involve the catalyst are quite complex, probably involving the formation and destruction of complexes between the metal moiety and the alcohol or polyene reactants, so that no one formula suitably describes the actual catalytic species. In one modification of the process of the invention, catalyst is introduced or produced in situ in a form represented by the formula $$L_4M$$

wherein L is the ligand $[R(O)_n]_3P$ defined hereinabove and M is palladium, platinum or nickel.

When M is palladium or platinum, the $L_4M$ may be prepared by the reduction reactions described in L. Malatesta and M. Angoletta, J. Chem. Soc., 1957, 1186 and L. Malatesta and C. Cariello, J. Chem. Soc., 1958, 2323. In an alternate modification of the process of the invention, palladium or platinum catalyst is introduced in a form represented by the formula $$L_2MZ_2$$

wherein Z is a carboxylate of a lower unsubstituted monocarboxylic acid of 2 to 7 carbon atoms and M is palladium or platinum. Illustrative of useful carboxylates are acetate, propionate, butyrate, hexanoate and benzoate; especially preferred is the acetate. The term L in the above formula represents the ligand defined hereinabove. The preferred ligand L is a tertiary phosphine when the metal moiety of the catalyst is palladium or platinum, i.e., $n$ is zero in the previously defined formula wherein L is the ligand $[R(O)_n]_3P$. Largely because of economic reasons, triphenylphosphine is a particularly preferred ligand. The $L_2MZ_2$ complexes, wherein M is palladium or platinum and Z is carboxylate as defined hereinabove, are prepared by treating the corresponding metal carboxylate, e.g., palladium acetate, with the desired tertiary phosphine ligand, e.g., triphenylphosphine, as described by T. A. Stephenson et al., J. Chem. Soc., 1965, 3632. A particularly useful catalyst is palladium acetate complexed with a tertiary phosphine ligand, for example, diacetatobis(triphenylphosphine)palladium. In another alternate modification of the process, the catalyst is provided in the form of several components which can be considered forming the catalyst in situ. Employing palladium for purposes of illustration, the metal component is supplied as π-allyl complex of palladium. The simplest member of this class is π-allylpalladium salt which, when the anion is chlorine, is represented by the following formula

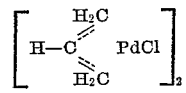

The preparation of this complex and related complexes is described by Huttel et al., Angew. Chemie, 71, 456 (1959). Other illustrative π-allyl complexes are represented by the formula

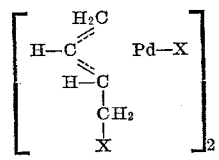

wherein X is halogen, which complexes are conveniently prepared by reaction of diene, e.g., butadiene or isoprene, with palladium halide in hydrocarbon media. It should be understood that analogous complexes of platinum are also suitable. Tertiary phosphine ligand is furnished by including as a second component any of the tertiary phosphines, e.g., triphenylphosphine, hereinabove described. The third component added can be considered a halogen removal agent and especially useful for this purpose are sodium borohydride, sodium formate, sodium phenoxide and the like. Alternatively the first and second components may be combined in one, as exemplified by dichlorobis(triphenylphosphine)platinum, and introduced with one of the above-named halogen removal agents.

When M is nickel, the $L_4M$ may be isolated from or prepared in situ from the reaction of a coordination complex of nickel, such as dicyclooctadienylnickel, bis-π-allylnickel and the like, with the ligand L; see, for example, B. Bogdanovic, M. Kroner and G. Wilke, Ann., 699, 17 (1966). An alternate method of preparation of the $L_4Ni$ comprises the in situ production thereof by reacting a nickel salt with a reducing agent such as trihydrocarbylaluminum or (hydrocarbyl-hydrocarbyloxy)-aluminum of from 3 to 35 carbon atoms per molecule or with hydrogen in the presence of ligand L; see, for example, R. D. Mullineaux, U.S. Patent 3,290,348, Dec. 6, 1966. In an alternate modification of the process of the invention, nickel catalyst is introduced or produced in situ in a form represented by the formula $$L(R)(X)Ni$$

wherein L is defined hereinabove, R is π-allyl and X is an inorganic or organic anion such as halide, cyanide, acetylacetonate, acetate and the like. In this connection π-allyl is meant to include not only the unsubstituted allyl moiety ($-C_3H_5$) but also substituted moieties such as π-metallyl ($-C_4H_7$), π-crotyl ($-C_4H_7$), π-cyclohexenyl ($-C_6H_9$), π-cyclooctenyl ($-C_8H_{13}$) and the like. By way of illustration this form of the catalyst may be conveniently obtained in situ by bringing together in the reaction zone π-allylnickel chloride or bromide and triphenyl phosphite, π-allylnickel cyanide and tris(o-phenylphenyl) phosphite, or π-cyclooctenylnickel acetylacetonate and triphenyl phosphite.

It is considered that in each above case the palladium, platinum or nickel compound is added as catalyst or catalyst precursor in the process of the invention. Laregly for reasons of convenience, economy and speed of reaction, the preferred metal-containing catalyst is a palladium-containing one. A particularly preferred catalyst is the palladium complex formed in situ from π-allylpalladium halide (chloride), triphenylphosphine and sodium borohydride.

The process of the invention is characterized by the requiremnt for only catalytic quantities of platinum, palladium or nickel compound. Although utilization of larger amounts of metal-containing catalyst is not detrimental to the process of the invention, amounts larger than about 5 mole percent based on total reactants are not generally required. Amounts of metal compound less than about 0.001 mole percent on the same basis are generally unsuitable because of the inevitable physical losses of catalyst during reaction and processing. In general, amounts of catalyst from about 0.01 mole percent to about 0.5 mole percent based on total reactants are satisfactory and are preferred.

The process of the invention is typically conducted by charging the reactants and catalyst to an autoclave or similar reactor and maintaining the reaction mixture at reaction temperature until reaction is complete. The method of mixing is not critical although it is generally preferred to mix the reactants and all the catalyst thereto. The reaction is suitably conducted throughout a moderate range of reaction temperatures and pressures, so long as the reactants are maintained are maintained substantially in the liquid phase. Reaction temperatures from about C. to about 70° C. are satisfactory, although temperatures from about 25° C. to about 50° C. are preferred. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. In the modification wherein solvent is employed, solvents that are suitable are those capable of dissolving the reactants and catalyst, and are inert to the reactants and the products prepared therefrom. Exemplary solvents are normally liquid ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; normally liquid aromatic hydrocarbons such as benzene, toluene and xylene; N,N-dialkyl alkanoic acid amides and N-alkyl lactams, e.g., dimethylformamide, N,N - dimethylacetamide, N,N - diethylacetamide and N-methylpyrrolidinone; halogenated hydrocarbons such as chloroform, carbon tetrachloride, tetrachloroethylene and methylene chloride; sulfoxides such as dimethyl sulfoxide; and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferable to conduct the reaction in the absence of added solvent whenever the physical characteristics of the reaction mixture will allow.

Subsequent to reaction, the desired ether product is recovered by conventional means such as selective extraction, fractional distillation, fractional crystallization or the like. When the recovery method requires a continuation of the reaction by heating, e.g., as in fractional distillation, then separation of, removal of or inactivation of the catalyst present is required prior to continuing the heating. A convenient method for inactivating catalyst is by exposure to air or bubbling carbon monoxide through the reaction mixture. The novel ether product obtained thereby is α,α-bis(trifluoromethyl)benzyl 2,7(11)-alkapolylenyl ether of the formula

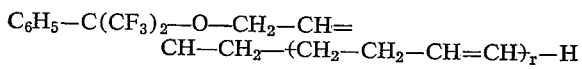

where $r$ is 1 or 2. When the starting polyene reactant of the process is 1,3-butadiene, the integer $r$ in the formula is 1 and the novel ether is α,α-bis(trifluoromethyl)benzyl 2,7-octadienyl ether. When the starting polyene reactant of the process is a mixture of butadiene and 1,3,7-octatriene, the integer $r$ in the formula is 2 and the novel ether is α,α-bis(trifluoro)benzyl 2,7,11-dodecatrienyl ether, formed along with some α,α-bis(trifluoro)benzyl 2,7-octadienyl ether.

It has been found that, when the reaction of the invention is continued by prolonging the heating of the α,α-bis(trifluoromethyl)benzyl 2,7(11)-alkapolyenyl ethers at the temperature of the reaction in which they are formed or by raising the temperature, e.g., for more rapid heating or for distilling, in the presence of the catalysts of the invention, the ethers are converted by a decomposition process to starting alcohol, α,α-bis(trifluoromethyl)benzyl alcohol, and 1,3,7(11)-alkapolyene of the formula

where $r$ is 1 or 2, i.e., 1,3,7-octatriene and/or 1,3,7,11-dodecatetraene. This conversion has been found to lend itself to a cyclic or continuous process for the formation of 1,3,7(11)-alkapolyene from the starting conjugated polyene defined hereinabove. By way of illustration, butadiene and α,α-bis(trifluoromethyl)benzyl alcohol can be heated for a period in the presence of, for example, tetrakis(triphenylphosphine)palladium producing therein α,α-bis(trifluoromethyl)benzyl 2,7-octadienyl ether. The pressure is then lowered and distillation overheads 1,3,7-octatriene while α,α-bis(trifluoromethyl)benzyl alcohol and catalyst remain in the reaction vessel. After the vessel is cooled, more butadiene is added and the process is repeated for numerous cycles, for example, eight or more, before any detectable decline in the activity of the catalyst is noticed. Similarly, 1,3,7,11-dodecatetraene, admixed with some 1,3,7-octatriene, is obtained when the starting conjugated polyene is a mixture of butadiene and 1,3,7-octatriene. Essentially all 1,3,7,11-dodecatetraene can be obtained by separation of the mixture of intermediate ether products, α,α-bis(trifluoromethyl)benzyl 2,7-octadienyl ether and α,α-bis(trifluoromethyl)benzyl 2,7,11-dodecatrienyl ether, into its component parts. Subsequent heating of α,α - bis(trifluoromethyl)benzyl 2,7,11 - dodecatrienyl ether in the presence of the instant catalysts produces essentially 1,3,7,11-dodecatetraene.

As mentioned above, the novel ether derivative of the diene homodimer, i.e., from butadiene, or of the diene co-dimer, i.e., from butadiene and 1,3,7-octatriene, is converted to the corresponding diene dimer of one more carbon-carbon double bond, i.e., 1,3,7(11)-alkapolyene, by a process of decomposition. In the modification wherein the ether derivative of the 1,3,7(11)-alkapolyene has been isolated, decomposition is effected by contacting the ether derivative again with a metal catalyst of the invention, optionally in the presence of solvent as above described, in an autoclave or similar reactor wherein the temperature and pressure of the reaction mixture can be controlled. The decomposition process, i.e., the conversion of the α,α-bis(trifluoromethyl)benzyl 2,7(11)-alkapolyenyl ether into the 1,3,7(11)-alkapolyene and α,α-bis(trifluoromethyl)benzyl alcohol corresponding to the substituted-benzyl moiety thereof, is effected by continuing the heating of the ether at the temperature of the reaction in which it was formed or by raising the temperature in the presence of the metal catalyst of the invention. A convenient manner of operation encompasses heating the ether in the presence of the catalyst and removing at least one decomposition product, i.e., the alcohol and/or the 1,3,7(11)-alkapolyene, from the reaction mixture. Although alternate methods of effecting removal of at least one of the decomposition products are available, e.g., as by processes of precipitation or through formation of more stable complexes or derivatives of one of the decomposition products, the preferred method of effecting removal of at least one decomposition product comprises a controlled removal of the decomposition product(s) in the vapor phase, e.g., by a process of distillation under controlled conditions of temperature and pressure. It will be apparent that in this latter process as in any distillation process the pressure and temperature required to effect removal of one product mixture component will be interdependent, and by selecting either a specific pressure or a specific temperature, the other variable will be determined by the physical laws governing the correlation of the vapor pressure of the compound undergoing vapor-phase removal with the temperature at which the material is maintained. It will also be apparent that at any given pressure, the temperature required to effect vapor phase removal of at least one decomposition product will depend upon the particular products obtained. For example, 1,3,7-octatriene is the lower boiling decomposition product and the product initially removed in the vapor phase will be the 1,3,7-octatriene. Where the other product is α,α-bis(trifluoromethyl)benzyl alcohol, the alcohol need not be recovered from the reactor and catalyst but can be used therein for another reaction cycle. Of course, relative boiling points are not critical, as upon the removal of at least one decomposition product, the subsequent removal of any single decomposition product which remains in product mixture is effected by distillation or other conventional means, e.g., selective extraction or the like. For example, subsequent to 1,3,7-octatriene removal from the product mixture resulting from decomposition of a mixture of α,α-bis(trifluoromethyl)benzyl 2,7-octadienyl ether and α,α-bis(trifluoromethyl) benzyl 2,7,11-dodecatrienyl ether, the remaining alcohol product and 1,3,7(11)-alkapolyene product, 1,3,7,11-dodecatetraene, are conveniently separated by fractional distillation at any convenient pressure and temperature, and the lower boiling and first recovered α,α-bis(trifluoromethyl)benzyl alcohol can be recycled to the reactor if desired.

As previously stated, the decomposition products are conveniently separated by distillation at reduced pressure, i.e., a pressure lower than atmospheric. Because the resulting lower temperatures favor longer catalyst life, satisfactory results are customarily obtained when pressures below about 100 mm. Hg are employed, although better results are typically obtained when a pressure below about 60 mm. is employed and pressures at or about 1-4 mm. are particularly suitble. The precise temperature at which initial vapor-phase removal of at least one decomposition product takes place will, as previously stated, depend upon the particular decomposition products. However, the effective temperature is readily determined by controllably raising the temperature of the reaction mixture at the selected reduced pressure until the vapor-phase removal of product takes place. In the case of the recovery of 1,3,7,11-dodecatetraene from the decomposition of α,α-bis(trifluoromethyl)phenyl 2,7,11-dodecatrienyl ether, typical temperatures are about 100° C. when pressures on the order of 2 mm. are utilized. In general, temperatures of from about 50° to about 110° C. are satisfactory and best result are obtained when a temperature from about 70° C. to about 90° C. is employed.

In the above-described modification of the process of the invention, the α,α-bis(trifluoromethyl)benzyl 2,7(11)-alkapolyenyl ether is employed as an isolated material. However, the separation and/or purification of the ether derivative is not required. Thus, in an alternate and preferred modification, the initial product mixture resulting from dimerization of the conjugated polyene reactants in the presence of α,α-bis(trifluoromethyl)benzyl alcohol is subjected to the decomposition process without further treatment, i.e., in the presence of the initial catalyst charge, and from the resulting mixture is removed at least one decomposition product.

The novel ether products of the invention are useful in a variety of applications. The unsaturated linkages can be hydrated or hydroxylated to form useful alcohol derivatives from which can be prepared esters or ethers. The ethylenic linkage serves as a dienophile in Diels-Alder condensations or as a reactive site for polymerization or copolymerization processes. The ether products may be hydrolyzed to form useful alkapolyenols, e.g., 2,7-octadienol, from which esters, sulfonates, sulfates and the like are prepared; for example, phthalic acid is esterified with 2,7-octadienol, to give di(2,7-octadienyl) phthalate, which is useful as a plasticizer for polyvinyl chloride and which upon polymerization yields a polyester resin. The ether products may be treated with organic peracids for the conversion of the ethylenic linkages into epoxy groups as described in copending application of W. De Acetis and E. J. Smutny, U.S. Ser. No. 456,001, filed May 14, 1965 and now Patent No. 3,432,465. For example, α,α-bis(trifluoromethyl)-benzyl 2,7,11-dodecatrienyl ether is reacted with peracetic acid to obtain the monoepoxides, the diepoxides and/or the triepoxides of 1-[α,α - bis(trifluoromethyl)benzyloxy] - 2,7,11 - dodecatriene;
1-[α,α - bis(trifluoromethyl)benzyloxy] - 2,3 - epoxy - 7,11-dodecadiene,
1-[α,α - bis(trifluoromethyl)benzyloxy] - 7,8 - epoxy - 2,11-dodecadiene,
1-[α,α - bis(trifluoromethyl)benzyloxy] - 11,12 - epoxy-2,7-dodecadiene,
1-[α,α - bis(trifluoromethyl)benzyloxy] - 2,3,7,8-diepoxy-11-dodecene,
1-[α,α - bis(trifluoromethyl)benzyloxy] - 2,3,11,12 - diepoxy-7-dodecene,
1-[α,α - bis(trifluoromethyl)benzyloxy] - 7,8,11 - 12,diepoxy-2-dodecene and
1-[α,α - bis(trifluoromethyl)benzyloxyl - 2,3,7,8,11 - 12 - triepoxydodecane are each useful for the production therefrom of resin products. The unsaturated epoxides, e.g., 1-[α,α-bis(trifluoromethyl)benzyloxy]-11,12-epoxy - 2,7 - dodecadiene or 1-[α,α - bis(trifluoromethyl)benzyloxy] - 2,3,7,8 diepoxy-11-dodecene, are first polymerized (polymerization of the ethylenic linkage) by heating with about 5% by weight of tert-butyl hydroperoxide or di-tert-butyl) peroxide and then cured (polymerization of the epoxy groups) by heating with an epoxy curing agent, e.g., about 15% by weight of phthalic andride. The triepoxide 1-[α,α - bis(trifluoromethyl)benzyloxy] - 2,3,7,8,11 - 12-triepoxydodecane, is cured by mixing a curing agent, e.g., about 12% by weight of diethylene-triamine, with the triepoxide and heating. The ether products also may be treated with primary or secondary organic amines for the conversion of the ether to an allylic-substituted sec- or tert-amine by the transallylation process described in copending application of T. M. Shryne, E. J. Smutny and D. P. Stevenson, U.S. Ser. No. 624,217, filed Mar. 20, 1967. For example, α,α - bis(trifluoromethyl) 2,7,-octadienyl ether is treated with dimethylamine in the presence of diacetatobis(triphenylphosphine)palladium as catalyst at 40° C. for 72 hours to produce N.N-dimethyl-2,7-octadienylamine in 100% conversion based on amine charged, and similarly, with methylamine to produce N - (2,7-octadienyl)methylamine. N,N - dimethyl-2,7-octadienylamine is converted with dilute hydrogen peroxide solution to a tert-amine-N-oxide having surface-active properties and useful as a detergent. N-(2,7-octadienyl)methylamine is reacted with 2-chlyoracetyl chloride to produce N-methyl - N - (2,7-octadienyl) - 2-chloroacetamide having herbicidal properties and useful as an herbicide.

The 1,3,7(11)-alkapolyene products of the invention i.e., 1,3,7-octatriene and 1,3,7,11-dodecatriene, are useful in a variety of applications. These linear unsaturates are useful as monomers in polymerization processes or are employed in copolymerization with other monomeric materials, e.g., ethylene and propylene, to form thermoplastic materials and elastomers. Their ethylenic linkages are epoxidized, as noted hereinabove for the ether precursors, to form epoxide products from which are formed useful epoxy resins through reaction with a variety of conventional curing agents, e.g., acid anhydrides or polyamines, or are hydrated or hydroxylated to form alcohols from which useful ethers, carboxylate esters, sulfates, sulfonates and the like are produced, or are halogenated to form halo derivatives useful, for example, as precursors for quaternary ammonium salts with germicidal properties. Additionally, the unsaturates are partially or completely hydrogenated to form other useful products.

Example 1

To a reactor were charged 83 parts by weight (0.34 mole) of α,α-bis(trifluoromethyl)benzyl alcohol, 37.2 parts by weight (0.69 mole) of butadiene and 0.115 part by weight (0.0001 mole) of terakis(triphenylphosphine) palladium as catalyst. The reaction mixture was maintained at about 25° C. for 144 hours and at the conclusion of this time carbon monoxide was bubbled through the product mixture for one-half hour to inactivate the catalyst. The product mixture was removed, filtered free from insolubles and distilled. From the distillation, α,α-bis(trifluoromethyl)benzyl 2,7 - octadienyl ether (named alternatively hexafluoro - 2 - phenyl - 2 - propyl octadienyl-2,7 ether), B.P. 110° C. at 1 mm. Hg, was obtained in a yield of 82.5%.

*Analysis.*—Calculated for $C_{17}H_{18}OF_6$: C, 57.9; H, 5.1. Found: C, 58.0; H, 5.0.

The infrared and nuclear magnetic resonance spectra and the mass spectrometric analysis were consistant with the proposed structure.

Example 2

To a reactor were charged 24.2 parts by weight (0.1 mole) of α,α-bis(trifluoromethyl)benzyl alcohol, 52 parts by weight (0.96 mole) of butadiene and, as catalyst, 1.17 parts by weight (0.0043 mole) of dicyclooctadienylnickel and 5 parts by weight (0.016 mole) of triphenyl phosphite. The reaction mixture was maintained at 80° C. for 64 hours and at the conclusion of this time the product mixture was analyzed by gas-liquid chromatography (GLC). The conversion of the alcohol was 40% with a selectivity of 70% to α,α-bis(trifluoromethyl)benzyl 2,7-octadienyl ether. Then air was bubbled through the product mixture for one-half hour to inactivate the catalyst. The product mixture was filtered free from insolubles and distilled. From the distillation was obtained α,α - bis(trifluoromethyl)benzyl 2,7 - octadienyl ether, B.P. 110° C. at 1 mm. Hg.

Example 3

To a reactor were charged 24 parts by weight (0.09 mole) of α,α-bis(trifluoromethyl)benzyl alcohol, 31 parts by weight (0.58 mole) of butadiene and 0.1 part by weight (0.00009 mole) of tetrakis(triphenylphosphine) palladium as catalyst. The reaction mixture was maintained at 70° C. for two hours and at the conclusion of this time the product mixture was analyzed by GLC. The conversion of alcohol was > 90% wtih a selectivity of 96% to α,α-bis(trifluoromethyl)benzyl 2,7-octadienyl ether. The product mixture was then distilled at reduced pressure (90 mm.). GLC analysis of the distillate indicated a 100% decomposition of the ether to alcohol and olefins with a 96% selectivity to 1,3,7-octatriene, a 2% selectivity to 4-vinylcyclohexene and a 2% selectivity to 1,3,6-octatriene.

Example 4

By a procedure similar to that of Example 3, a mixture of 0.55 mole of α,α-bis(trifluoromethyl)benzyl alcohol, 2.3 moles of butadiene, 0.0045 mole of π-allylpalladium chloride, 0.0176 mole of triphenylphosphine and 0.2 g. of sodium borohydride was maintained at 70° C. for three hours. The resulting product mixture was distilled at 80° C. at 100 mm. pressure, resulting in an 82% yield of 1,3,7-octatriene.

Example 5

By a procedure similar to that of Example 3, a mixture of 0.115 mole of α,α-bis(trifluoromethyl)benzyl alcohol, 1.15 moles of butadiene and 0.01 mole of diacetatobis(triphenylphosphine)palladium was maintained at 70° C. for 21 hours. The resulting product mixture was distilled at 50° C. at 60 mm. pressure. GLC analysis of the distillate indicated a 64% conversion based on butadiene charged with a 98% selectivity to 1,3,7-octatriene, a 1.2% selectivity to 1,3,6-octatriene and an 0.8% selectivity to 4-vinylcyclohexene.

Example 6

To a 16-gallon nitrogen-purged autoclave were charged 61 pounds of α,α-bis(trifluoromethyl)benzyl alcohol, 45 g. of π-allylpalladium chloride, 245 g. of triphenylphosphine, 430 g. of butadiene and 43 g. of sodium borohydride. An additional 1000 g. of butadiene was added and the reaction mixture was heated to 40° C. Stepwise addition of butadiene was continued to maintain 20 p.s.i.g. pressure in the autoclave until a total of 24 pounds of butadiene had been added to the vessel. The temperature was raised to 60° C. for two hours and at the conclusion of this time 1,3,7-octatriene was overheaded at 70° C. under reduced pressure (20–50 mm.). The autoclave, still containing α,α-bis(trifluoromethyl)benzyl alcohol and catalyst, was cooled to 40° C. and recharged with butadiene for repetition of the reaction. After eight cycles there was no detectable decline in the activity of the catalyst. A production of 10 pounds of 1,3,7-octatriene per gram of palladium utilized was achieved.

Example 7

To a reactor were charged 21.6 g. (0.2 mole) of 1,3,7-octatriene, 24.2 g. (0.1 mole) of α,α-bis(trifluoromethyl)benzyl alcohol, 11 g. (0.2 mole) of butadiene, 0.43 g. of π-allylpalladium chloride, 0.0015 g. of triphenylphosphine and 0.1 g. of sodium borohydride. The mixture was maintained at 40° C. for 44 hours, whereupon GLC analysis of a portion of the product indicated a 75% conversion of the alcohol to give a mixture of 51% α,α-bis(trifluoromethyl)benzyl 2,7-octadienyl ether and 49% α,α-bis(trifluoromethyl)benzyl 2,7,11-dodecatrienyl ether. The resulting mixture was distilled at reduced pressure (2 mm.). GLC analysis of the distillate indicated a 90% decomposition of the ethers to alcohol and olefins with a 95% selectivity to 1,3,7-octatriene and 1,3,7,11-dodecatetraene.

In a similar experiment, before distilling and after inactivating the catalyst by bubbling carbon monoxide through the ether product mixture for one-half hour, quantities of α,α-bis(trifluoromethyl)benzyl 2,7-octadienyl ether and α,α-bis(trifluoromethyl)benzyl 2,7,11-dodecatrienyl ether were isolated by GLC trapping or by distillation of the appropriate product mixture. α,α-bis(trifluoromethyl)benzyl 2,7,11-dodecatrienyl ether, B.P. 183° C. at 2 mm. Hg, $n_D^{20}$ 1.46392, had the following elemental analysis.

*Analysis.*—Calculated for $C_{21}H_{24}OF_6$: C, 62.0; H, 5.9. Found: C. 62.0; H, 6.5.

The infrared and nuclear magnetic resonance spectra were consistent with the proposed structure.

I claim as my invention:

1. The α,α-bis(trifluoromethyl)benzyly 2,7(11)-alkapolyenyl ether of the formula $C_6H_5$—$C(CF_3)_2$—O—$CH_2$—CH=
   CH—$CH_2$—(—$CH_2$—$CH_2$—CH=CH)$_r$—H wherein r is a whole number from 1 to 2 inclusive.

2. The compound of claim 1 wherein r is 1.
3. The compound of claim 1 wherein r is 2.
4. The process of reacting α,α-bis(trifluoromethyl)benzyl alcohol with from about 0.25 to about 10 moles per mole of tertiary alcoholic hydroxyl group of conjugated polyene, selected from the group consisting of 1,3-butadiene and a mixture of 1,3-butadiene and 1,3,7-octatriene wherein 1,3,7-octatriene is present in from about 0.5 to about 10 moles per mole of 1,3-butadiene, at a temperature from about 0° C. to about 70° C. and a pressure of from about 1 to about 80 atmospheres, in the presence of from about 0.001 mole percent to about 5 mole percent based on total reactants of a metal compound catalyst wherein the metal is palladium, platinum or nickel complexed with a ligand of the formula $[R(O)_n]_3P$ wherein n is zero when the metal is palladium or platinum, n is one when the metal is nickel and R independently is a hydrocarbyl group of from 1 to 10 carbon atoms with only aromatic unsaturation, to produce the α,α-bis(trifluoromethyl)benzyl 2,7(11)-alkapolyenyl ether of the formula $C_6H_5$—$C(CF_3)_2$—O—$CH_2$—CH=
   CH—$CH_2$—(—$CH_2$—$CH_2$—CH=CH)$_r$—H wherein r is a whole number from 1 to 2 inclusive.

5. The process of claim 4 wherein said catalyst in the resulting mixture subsequently is inactivated and said ether product is recovered therefrom.

6. The process of claim 4 wherein the reaction is continued for a sufficient period of time to produce 1,3,7(11)-alkapolyene of the formula

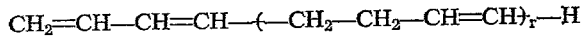

wherein $r$ is a whole number from 1 to 2 inclusive by the decomposition of said ether into $\alpha,\alpha$-bis(trifluoromethyl)benzyl alcohol and said 1,3,7(11)-alkapolyene.

7. The process of claim 4 wherein $r$ is 1 and the conjugated polyene reactant is 1,3-butadiene.

8. The process of claim 4 wherein the conjugated polyene reactant is a mixture of 1,3-butadiene and 1,3,7-octatriene and the ether produced is a mixture wherein $r$ is 1 and 2.

9. The process of claim 6 wherein the conjugated polyene reactant is 1,3-butadiene, the metal compound catalyst is a palladium catalyst produced in situ from the interaction of $\pi$-allylpalladium halide, triphenylphosphine and sodium borohydride and the 1,3,7(11)-alkapolyene product is 1,3,7-octatriene.

10. The process of claim 8 wherein the metal compound catalyst is a palladium catalyst produced in situ from the interaction of $\pi$-allylpalladium halide, triphenylphosphine and sodium borohydride.

References Cited

UNITED STATES PATENTS 3,267,169  8/1966  Smutny ------------ 260—682

OTHER REFERENCES

Tsuji: Jour. Soc. of Org. Syn. Chem., Japan, vol. 22, No. 11, November 1964, p. 888.

BERNARD HELFIN, Primary Examiner

U.S. Cl. X.R.

71—118; 252—152; 260—2, 31.6, 85.3, 348, 475, 551, 583, 635, 682